United States Patent [19]

Johnson, Jr. et al.

[11] 4,315,596
[45] Feb. 16, 1982

[54] ENERGY CONSERVATION SYSTEM FOR INNS, HOTELS, AND MOTELS

[75] Inventors: Philip Johnson, Jr., Santa Ana; Luis Mendoza, Tustin; Donald Sodaro, Santa Ana, all of Calif.

[73] Assignee: Innkeepers Electronics, Inc., Santa Ana, Calif.

[21] Appl. No.: 129,248

[22] Filed: Mar. 11, 1980

[51] Int. Cl.³ .................... G05D 23/00; H01H 3/16
[52] U.S. Cl. .................................. 236/94; 70/57; 165/11 R; 200/61.62
[58] Field of Search .................... 165/11; 62/158, 131; 236/47, 1 R, 94; 70/57; 340/542, 545; 200/61, 62

[56] References Cited

U.S. PATENT DOCUMENTS 4,058,740 11/1977 Dalton et al. .................. 165/11
4,091,866 5/1978 Curatolo .................. 236/1 R X
4,107,941 8/1978 Hamilton .................. 236/1 R X

*Primary Examiner*—William E. Wayner
*Attorney, Agent, or Firm*—Blakely, Sokoloff, Taylor & Zafman

[57] ABSTRACT

The present invention provides a system for reducing the unproductive consumption of energy by equipment primarily intended to be operated during the presence of a person or thing in the area of operation of the equipment. The system renders the equipment operable during the time a person or thing is present within the area of operation and for a short period of time immediately thereafter. Except for the short period of time immediately after the person or thing exits the area of operation, the system renders the equipment inoperable during the time the person or thing is absent from the area of operation. Maintaining the equipment operable during the short period of time after the person or thing exits the area of operation reduces deleterious recycling which would otherwise occur in the event the area of operation were reentered within the short period of time. The system comprises detecting means for providing a presence-detected signal when a person or thing is present within the area of operation and an absence-detected signal otherwise. The system also comprises delay means responsive to said detecting means for providing a delay signal for a short period of time after the detecting means starts providing the absence-detected signal. The detecting means and delay means are coupled to output means which provides an enabling signal when any of the presence-detected signal and the delay signal are present and a disabling signal otherwise.

35 Claims, 4 Drawing Figures

ENERGY CONSERVATION SYSTEM FOR INNS, HOTELS, AND MOTELS

BACKGROUND OF THE INVENTION

1. Field of the Invention

The invention relates to the field of energy consumption reduction systems for inns, hotels, motels and similar enterprises providing temporary lodging.

2. Prior Art

With the current increases in costs for energy there has been an even greater increase in the demand to reduce the unproductive comsumption of energy. For the hotel/motel industry a readily apparent and large amount of unproductive energy comsumption occurs when unoccupied rooms are heated or cooled. Heretofore the reduction of such unproductive energy comsumption has been attempted by having each room's temperature control unit (i.e., its air conditioner and/or heater) capable of being controlled from a master console. At the master console an operator aware of a guest's comings and goings manually throws the appropriate switch to turn off the temperature control unit in the guest's room. Such a master console would usually be placed at the front desk of the hotel, motel, or inn (hereinafter referred to simply as the "hotel") and would be operated by the desk clerk. Systems as described above have obvious disadvantages in that they depend on the clerk's observing a guest leaving the hotel, the clerk's remembering which room the guest has been assigned, and the clerk's taking the positive action of throwing the appropriate switch to turn off the temperature control unit in the guest's room. With such a system the likelihood is that for as long as the guest is registered at the hotel, the clerk will not turn off the temperature control unit regardless of the guests's presence of absence from the room. There is also a substantial likelihood that even when the guest has checked out of his room, the clerk will still forget to turn off the temperature control unit. Thus the expensive, unproductive consumption of energy is hardly reduced with such a system.

Another attempt to eliminate the heating or cooling of an unoccupied hotel room consists of serially connecting to the temperature control unit a switch which, if the system operates as intended, could only be closed when the room is occupied and which must be opened by the guest when he leaves the room. Such a system usually employs either a switch which is closed upon the insertion of the room key or a switch which is closed when the dead bolt on the room's door is closed. In theory, when the guest leaves his room he would have to remove his key from the switch and therefore turn off the temperature control system. The dead bolt, of course, would have to be opened in order for the guest to leave the room. This type of system is disadvantageous in that it requires guest intervention which may be annoying. An even greater disadvantage is that such a system is easily circumvented by the guest. For example, a system using a key activated switch is overcome by the guest leaving his key behind when he departs from his room and obtaining a second key from the desk clerk. A system using a switch activated by a dead bolt is overcome by the guest's stuffing paper into the lock of the dead bolt. In either case, the purpose of the system is thwarted and only a small amount of reduction of energy consumption is achieved.

SUMMARY OF THE INVENTION

The object of the invention is to provide a system which will reduce unproductive energy consumption.

It is a further object of the invention to provide a system which will turn off the temperature control unit of a room when the room becomes unoccupied.

It is a further object of the invention to provide a system for hotels, which system will reduce the consumption of energy by the hotel by allowing the temperature control unit of a room to be turned on only when the room is occupied (or during extreme temperature conditions) and which system is not easily circumvented.

These and other objects are accomplished by the invention which includes a switching means through which electrical power is switched from a conventional electrical outlet to a temperature control unit of a room. The temperature control unit is turned on when the power switching means is enabled and turned off when the power switching means is disabled. The switching means is enabled and disabled by a latch means configured to receive input signals in a manner which indicates when the room is entered and when it is vacated. The controller also comprises a timer to which the latch means is coupled. When the latch means receives signals indicating that the room is occupied, the output of the controller enables the switching means and the temperature control unit is turned on. When the latch means receives signals indicating that the room is vacated, the output of the controller disables the switching means after a delay period provided by the timer. The timer interposes the delay period to eliminate excessive recycling of the temperature control unit upon frequent reentering of the room which often occurs in hotels. The controller may also comprise other circuitry allowing for the enabling and disabling of the switching means during extreme temperature conditions and peak load periods, respectively. Further, the controller may comprise circuitry for detecting a remote signal whereby the temperature control unit may be turned off from a remote station.

DETAILED DESCRIPTION OF THE INVENTION

In the discussion which follows, the invention is described in its preferred embodiments. In view of the disclosure herein, equivalent embodiments of the invention will become obvious to those skilled in the art.

Figure 1:
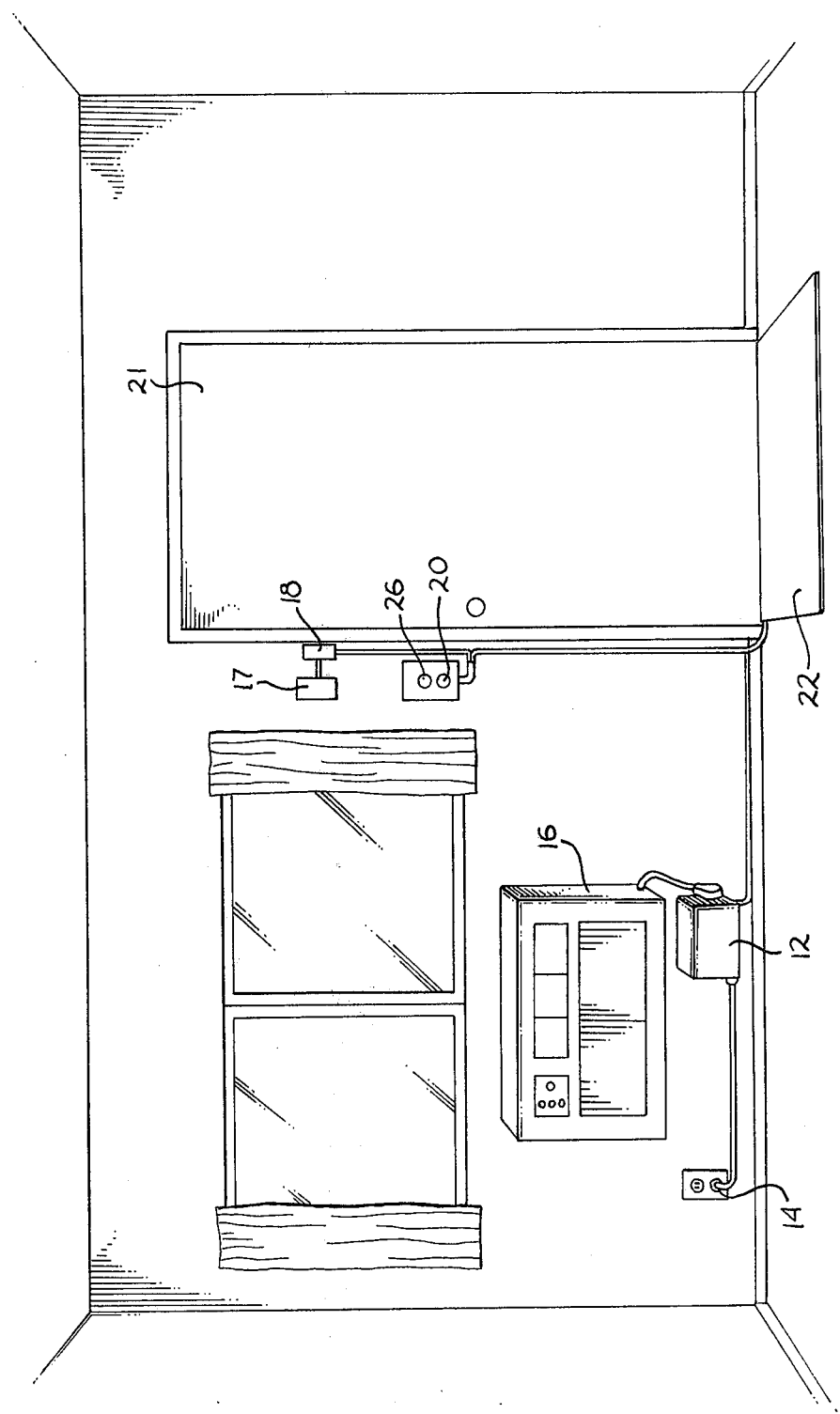
FIG. 1 is a diagrammatic representation of the invention incorporated into a room of a hotel.

Referring to FIG. 1, the energy conservation system of the present invention is diagrammatically illustrated as installed in a hotel room. Switching means 12 applies power from a standard alternating current source 14 to temperature control unit 16. The temperature control unit may be either on air conditioner or a heater, or maybe a combination of the two. The switching means is enabled (i.e., it allows electrical power to pass through it to the temperature control unit) or is disabled (i.e., it blocks the passage of electrical power to the temperature control unit) by controller 18. The controller receives inputs indicating whether or not the room is occupied from the door switch 32 (shown schematically in FIG. 3) and from manually operated switch 26 and/or floor switch 34 (shown schematically in FIG. 3). Controller 18 will only enable the switching means if the room is occupied or if extreme temperature conditions exist. The controller receives inputs regarding temperature conditions from thermostat 17. The controller may also be adapted to receive an input signal which signal indicates that the maximum peak power demand level has been reached from a remote source. For example, such peak power demand signal may be a radio frequency ("RF") signal carried on the alternating current line. When such a signal is received, controller 18 will disable the switching means. Lamp 20 indicates to the room's occupant whether the controller has received inputs from the door switch, the manually operated switch, and the floor switch which would allow the switching means to be enabled. It should be apparent that the controller and switching means, and also the electrical connections between them, may be embedded within the walls of the room or otherwise hidden from view. It should also be apparent that a separate on-off switch (not shown) may be connected to the temperature control unit so that a person occupying the room may directly turn it off without having to interpose the system of the invention. In a similar manner, a thermostat (not shown), other than thermostat 17, may be directly connected to the temperature control unit so that the room occupant may determine what temperature the room should be heated (or cooled) to.

It is a basic presumption that once door 21 is opened the room will become unoccupied and will remain so even after the door is closed. On the other hand, if door 21 is closed and certain activity occurs within the room, it is presumed that the room is occupied and will remain occupied until the door is opened again. Such presumptions are reasonable, particularly in the hotel industry. When a room is being entered, the door is opened and then closed, and after the door is closed, activity occurs within the room. When the guest is leaving a room the door is opened. While some activity may take place in the room while the door is opened, such as gathering up of a brief case, the guest soon steps out and the door is closed with no activity occurring thereafter in the room until the guest returns. The present invention and the prior art devices discussed in the prior art section above take advantage of these presumptions. However, as will become clear from this disclosure, the present invention, unlike the prior art devices, may be constructed so that it does not require annoying guest intervention nor is it as susceptible to being circumvented. In addition, the present invention makes accommodation for a guest's exiting and quickly reentering the room such as when a car is being unloaded or when ice is being obtained. Where prior art systems are used, unless the guest circumvented the prior art system, the temperature control unit experiences frequent and deleterious recycling.

As discussed above, controller 18 receives input signals which indicate whether or not the room is occupied. In this regard, if either manually operated switch 26 or floor switch 34 is closed while door 21 is closed (i.e., activity occuring in the room after the door is closed), controller 18 will generate an output enabling switching unit 16. Temperature control unit 16 is thereby turned on. Where the temperature control unit has a separate on-off switch, the temperature control unit will be in the operable state when the enabling signal is provided. The controller will maintain the enabling output until door 21 is opened or until a peak power demand RF signal is received. If a peak power demand RF signal is received, switching means 12 will be disabled by the controller immediately and the temperature control unit will be inoperable. However, if door 21 is opened, indicating that the room is being vacated, controller 18 will disable the switching means after a brief delay time. This delay time provides for situations in which the door is opened because of a second person entering the room or because the guest is leaving the room for only a short period of time (e.g., to get some ice). If during the delay time door 21 is closed and manually operated switch 26 or floor switch 34 is closed after door 21 is closed, controller 18 will abort the generation of a disabling output and will continue to maintain the enabling output until the next time the door is opened or the RF signal is received.

Door switch 32 is closed whenever door 21 is closed. In the preferred embodiment of the invention, door switch 32 provides a constant ground when it is closed as an input to the controller. Thus, door switch 32 is of the locking type, that is, when such switch is physically thrown it maintains electrical contact until it is released. Floor switch 34 is closed whenever floor mat 22 is stepped on . In the preferred embodiment, the floor switch and manually operated switch 26 provide, when closed, a ground for only a moment as an input to the controller. Therefore, the floor switch and the manually operated switch are each preferably a momentary switch, that is, a switch in which contact is made only momentarily and then immediately broken when the switch is physically thrown. With the use of momentary switches, guests will be virtually precluded from circumventing the system by such ploys as placing a weight (e.g., a telephone book) on mat 22 or stuffing foreign matter (e.g., a matchbook cover) into manually operated switch 26 in attempts to keep them closed.

Figure 2:
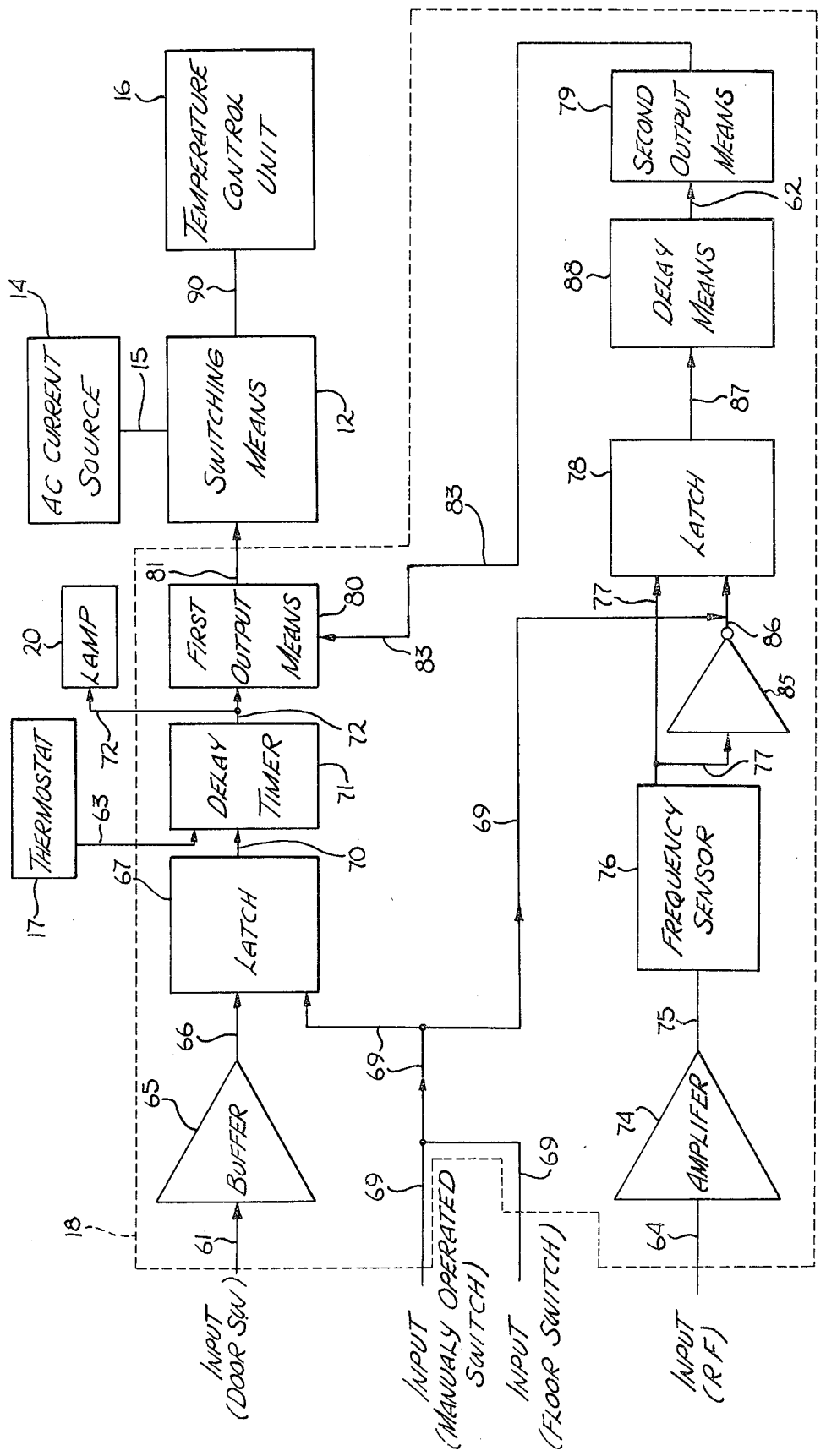
FIG. 2 is a block diagram illustrating the invention.

Referring to FIG. 2, the present invention is illustrated in block diagram form. The input from the door switch is applied to input line 61 of buffer 65 which is coupled via line 66 to one input terminal of latch 67. The input from the manually operated switch is applied to input line 69. Input line 69 also receives the input from the floor switch. The signals received on line 69 are applied to the second input of latch 67. Latch 67 operates so that as long as the input from door switch 32 is high, latch 67 maintains a high output and cannot be reset. Latch 67 will also maintain the high output after a low input is received from the door switch. The output of latch 67 will become low only if a low input is received from manually operated switch 26 or floor switch 34 while the input from the door switch is low. The low output of latch 67 will be maintained until door switch 32 is opened. In the preferred embodiment, a high output of latch 67 is indicative of a guest being absent from the room (i.e., it is an absence-detected signal). Conversely, a low output of latch 67 indicates the presence of a guest (i.e., it is a presence-detected signal).

In the preferred embodiment, latch 67 is serially connected to delay timer 71 via line 70. The delay timer is coupled to first output means 80 via line 72. The first output means is coupled via line 81 to switching means 12. The delay timer is configured so that it provides a high output when the presence-detected signal is applied to it. The delay timer also provides a high output (referred to here as a timer signal) for a predetermined period of time starting when the absence-detected signal begins to be applied to it. In this embodiment a high output from the delay timer may be viewed as a presence-assumed signal and a low output from the delay timer may be viewed as an absence-assumed signal. First output means 80 follows delay timer 71, with an exception to be discussed below, providing an enabling signal when a presence-assumed signal is received and providing a disabling signal when an absence-assumed signal is received.

In another embodiment (not shown), latch 67 and delay timer 71 may be coupled together and each may be coupled to first output means 80. First output means 80 is configured to provide an enabling signal when any of the presence-detected signal and the timer signal is present and a disabling signal when none is present. However, it is clear that this embodiment and the preferred embodiment function equivalently.

Returning to the discussion of the preferred embodiment, the output of delay timer 71 is also supplied to lamp 20 via line 73. The lamp lights whenever the delay timer's output is low, thereby indicating that the inputs to latch 67 are indicative of the room being vacant.

The exception referred to above relates to an inhibit signal which is applied to first output means 80 via line 83. When the inhibit signal is applied, the first output means provides a disabling signal regardless of whether a presence-detected signal, a presence-assumed or a timer signal is applied to the first output means.

The inhibit signal is brought about by the application of a peak power demand RF signal. The peak power demand RF signal is applied to the controller at line 64. The RF signal is amplified by amplifier 74 and applied via line 75 to frequency sensor 76. The frequency sensor is configured so that its output is low whenever the RF signal is present. Its output is high at all other times. The output of the frequency sensor is applied to one of the inputs of latch 78 via line 77. The output of the frequency sensor is also applied to inverter 85 via line 77. The output of the inverter is applied to the other input of latch 78 via line 86.

Line 86 is also tied to line 69 so that whenever the input signal from the manually operated switch or the floor switch is low, latch 78 is reset. Thus, the signals provided on line 69 acts as inhibit override signals.

Latch 78 is configured so that its output is low whenever the output from the frequency sensor is high (i.e., no RF signal is present). The output of latch 78 will remain high until the frequency sensor output returns to high (i.e., the RF signal disappears), at which time the latch 78 output will return to low. The output of latch 78 will also return to low if a low input (i.e., an override signal) is received from line 69. The output of latch 78 will remain low until the output of frequency sensor 76 goes high and then low again.

The output of latch 78 is applied to the input of delay means 88 via line 87. Delay means 88 is configured so that its output goes to low upon its receiving a high input from latch 78. When the output of latch 78 goes to low, the output of delay means 88 returns to the high state after a delay period predetermined by the configuration of the delay means.

The low output provided by delay means 88 during the delay period may be termed a delay signal. The output of the delay means is applied to second output means 79 via line 62. The second output means provides the inhibit signal whenever latch 78 provides a high output and whenever the delay signal is present.

The output of the second output means is applied to the first output means 80 via line 83. When the inhibit signal is applied it inhibits the first output means and causes a disabling signal to be applied to switching means 12.

As can be seen, controller 18 is configured to apply a disabling signal to switching means 12 when the peak power demand RF signal is present. The frequency sensor for the controller in each room may be configured to sense the presence of a RF signal of a predetermined frequency. Thus, during periods of peak power demand, only a fraction of the total rooms of a hotel need have their temperature control units turned off. For example, one third of a hotels rooms frequency sensors may be configured to sense a 90 KHz signal, another third configured to sense a 105 KHz signal, and the remaining third configured to sense a 120 KHz signal. During a period of peak power demand the 90 KHz, 105 KHz and 120 KHz RF signals could be applied for short periods on a rotation basis such that only one third of the rooms have their temperature control units turned off at any one time.

The delay means of each controller is preferably configured to provide a different delay period for the removal of the inhibit signal from line 83 after the RF signal is removed. With each delay means providing a different delay period, the development of overloads during the starting up of the temperature control units can be avoided.

The reset input of latch 78 is coupled to line 69 so that a room which had been previously unoccupied, and which therefore did not have its temperature control unit on when the RF signal was applied, may have its temperature control unit turned on. This feature is provided because with the system of the present invention, a room which is unoccupied for a substantial period of time may become uncomfortably warm (or cold if its winter) and immediate relief may be called for.

To accommodate extreme temperature conditions, thermostat 17 is coupled to an input of the delay timer via line 63. In such a configuration, the thermostat will provide a signal to the delay timer which will cause it to output on enabling signal during extreme temperature conditions, such as freezing temperatures or extremely high temperatures (when humidity is usually correspondingly high).

Figure 3:
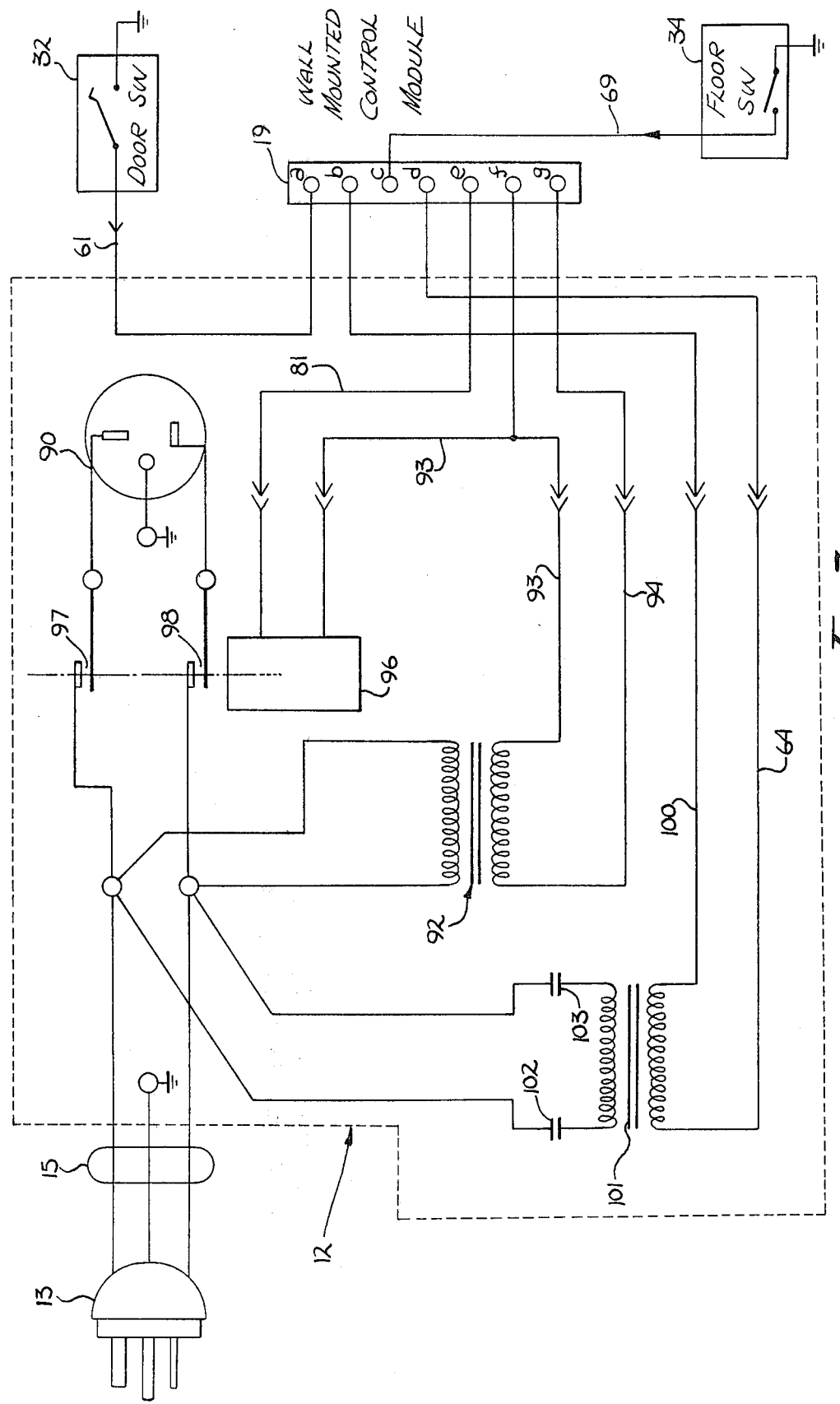
FIG. 3 is a circuit diagram of the portion of the system illustrated in FIG. 2 comprising the switching means.

The preferred embodiment of switching means 12 is illustrated in FIG. 3. The electrical components shown in FIG. 3 (and in FIG. 4) may be ordinary components, all of which are commercially available. The alternating current for running the temperature control unit is supplied to the switching unit from alternating current source 14 via plug 13 and electrical cable 15. When the switching means is enabled, the electrical power is available for the temperature control unit at receptacle 90. The power switching means is coupled to the controller via interconnection means 19, shown also in FIG. 4. The alphabetical characters illustrated on the interconnection means show the correspondance between electrical leads in the switching unit and those in the controller. Thus "a" connects to "a", "b" to "b" and so on.

The primary winding of step-down transformer 92 is coupled to the source of alternating current, cable 15. The secondary of transformer 92 applies voltage to the controller via lines 93 and 94. In the preferred embodiment, the signals from door switch 32 and floor switch 34 are routed through the switching unit via lines 61 and 69, respectively.

The output of the controller, that is, the signal which enables or disables the switching unit, is received on line 81. The output of the controller is applied to one of the inputs of power relay 96. The other input of the power relay is tied to line 93 from the secondary winding of transformer 92. As will be clear from the discussion to follow in respect to FIG. 4, when the output of the controller is an enabling signal, lines 81 and 94 are at the same potential so that power relay 96 receives the secondary voltage provided by transformer 92. When this occurs, contacts 97 and 98 are closed and the alternating current is applied to the temperature control unit via receptical 90. When the output of the controller is a disabling signal, line 81 behaves as an open, the power relay receives no current, and contacts 97 and 98 open. In such a state, no alternating current is available at receptical 90 and the temperature control unit is inoperable.

The peak power demand RF signal is applied to the controller via line 64, which is coupled to one of the terminals of the secondary winding of transformer 101. The other terminal of the secondary of transformer 101 is connected to ground via line 100. The primary of transformer 101 is coupled to capacitors 102 and 103 which in turn are coupled to cable 15. This cable carries the alternating current which at times carries the RF signal.

Figure 4:
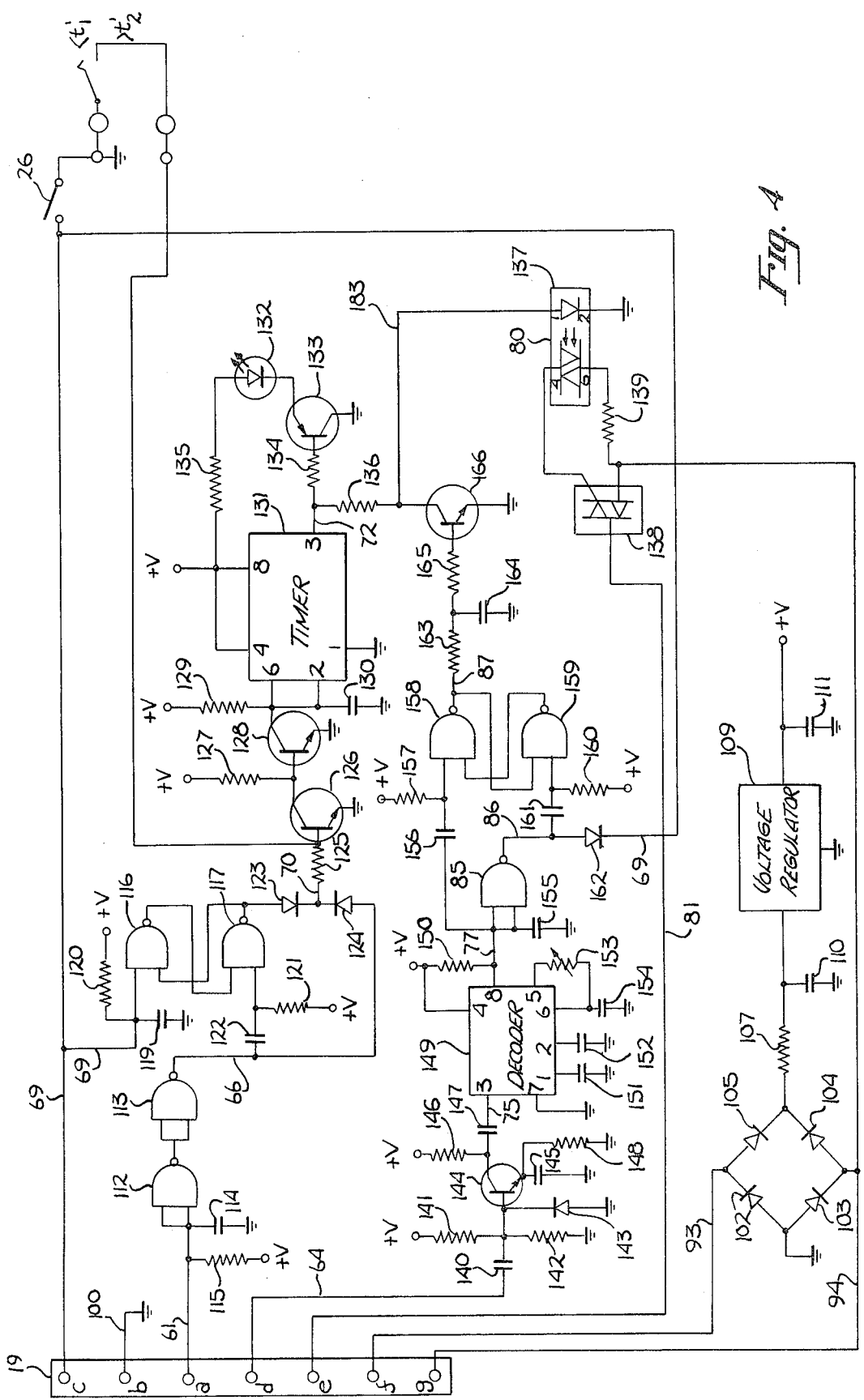
FIG. 4 is a circuit diagram of the portion of the system illustrated in FIG. 2 comprising the controller.

FIG. 4 illustrates in detail the preferred embodiment of controller 18, which is illustrated in block diagram form in FIG. 2. Frequent cross reference to the elements described in connection with FIG. 2 will be made in the discussion to follow. Connections to the switching means are made via interconnection means 19. Manually operated switch 26 and thermostat 17 are wired directly to the controller. The controller's power is derived from the voltage applied at lines 93 and 94 to the rectifier comprised of diodes 102, 103, 104, and 105. The output of the rectifier is coupled to resistor 107. The resistor is coupled to capacitor 110 and voltage regulator 109. This voltage regulator, which may be the LM7805C manufactured by National Semiconductor, provides a 5 volt output. The 5 volt output is referred to as the voltage source and is designated as +V, and as illustrated, is applied to numerous elements of the controller. Voltage regulator 109's output is also coupled to capacitor 111.

Buffer 65 is comprised of nand gates 112 and 113, each having its inputs tied together, connected in series to one another. The inputs to nand gate 112 are tied to line 61, the door switch signal line, and are also coupled to capacitor 114 which is connected to ground and resistor 115, which is connected to the voltage source.

Latch 67 is comprised of nand gates 116 and 117 coupled together to form a R/S flip flop. One input of the nand gate 116 component of the R/S flip flop is tied to line 69, the manually operated switch and floor switch signal line, and is coupled to capacitor 119, which is coupled to ground, and resistor 120, which is coupled to the voltage source. One input of the nand gate 117 component of the R/S flip flop is coupled to resistor 121, which is coupled to the voltage source, and capacitor 122. The other terminal of capacitor 122 is coupled to the output of the buffer by line 66. Latch 67 also comprises diodes 123 and 124. The anode of diode 123 is coupled to the output of nand gate 117. The anode of diode 124 is coupled to the output of buffer 65 via line 66. The cathodes of the diodes are tied together at line 70 to form the output of latch 67.

The output of latch 67 is coupled to resistor 125. The other lead of resistor 125 is coupled to the delay timer. The delay timer comprises npn transistor 126, having a base coupled to resistor 125 and, via line 63, to thermostat 17 which closes its switch at temperatures below $t_1°$ and about $t_2°$, an emitter tied to ground, and a collector coupled to resistor 127, which is coupled to the voltage source. The collector of transistor 126 is also coupled to the base of npn transistor 128. The emitter of transistor 128 is tied to ground. The collector of transistor 128 is coupled to the threshold and trigger connections of timer 131. Timer 131 maybe of the type LM 555 manufactured by National Semiconductor. (Shown within the block representing timer 131 are the pin connection numbers typical for such timers.) The threshold and trigger connections, pin connections 6 and 2, respectively, are also coupled to capacitor 130, which is tied to ground, and resistor 129, which is coupled to the voltage source. Resistor 129 and capacitor 130 determine the approximate predetermined period of time after door 21 opens that the output of the controller will become a disabling signal. The approximate delay time, $t_d$, is calculated as follows:

$$t_d = 0.693 RC$$

where R is the value of resistor 129 and C is the value of capacitor 130. Thus, if a delay time of about four (4) minutes were desired, C should equal 47 microfarads and R should be about five (5) megaohms. Pin connection 1 of timer 131 is connected to ground. Pin connection 3 is the output of the timer and is available at line 72.

The rest and voltage connections of timer 131, pin connections 4 and 8 respectively, are tied together and coupled to the voltage source. They are also connected to resistor 135 which is coupled to the anode of LED 132. The cathode of LED 132 is connected to the emitter of pnp transistor 133, the collector of which is tied to ground. The base of transistor 133 is coupled to resistor 134, which is coupled to the output of timer 131 via line 72. When the output of timer 131, which is the output of delay timer 71, is low (i.e., door 21 has opened and delay time $t_d$ has elapsed without door 21 closing and either of manually operated switch 26 or floor switch 34 closing), transistor 133 conducts and LED 132 becomes lit. The light given off by the LED provides the light for lamp 20.

If door 21 were opened because one person left the room while another person remained, the lamp would light to indicate to the remaining person that the manually operated switch or the floor switch should be closed again to make the temperature control unit operate.

The output of the delay timer is coupled to resistor 136. This resistor is coupled to first output means 80. Output means 80 comprises optically isolated triac driver 137. This triac driver may be of the type MOC 3010 manufactured by Motorola. Again, typical pin connection numbers are shown within the box representing the triac driver. Resistor 136 is coupled to the anode (pin 1) of the triac driver via line 183. The cathode (pin 2) of the triac driver is tied to ground. The output means also comprises triac 138. The triac may be of the type 2N6070 manufactured by Motorola. The gate of triac 138 is coupled to one main terminal (pin 4) of the triac driver. The other main terminal (pin 6) of the triac driver is coupled to resistor 139. Resistor 139 is coupled via line 94 to the input main terminal of triac 138. The output main terminal of triac 138 is the output of the controller and is line 81. As can be seen, when triac driver 137 receives current from line 183, triac 138 conducts and allows current from line 94 to be output on line 81. The switching means is thereby enabled. When no current is received by triac driver 137 via line 183, triac 138 is blocked and line 81 is open. This results in the switching means being disabled.

The peak power demand RF signal is applied via line 64 to amplifier 74. Amplifier 74 comprises capacitor 140 one side of which is tied to line 64, the second side of which is tied to resistor 141. Resistor 141 is coupled to the voltage source. The second side of capacitor 140 is also coupled to resistor 142 and the cathode of diode 143. Resistor 142 and the anode of diode 143 are connected in parallel to ground. The second side of capacitor 140 is also coupled to the base of npn transistor 144 whose emitter is coupled to capacitor 145 and resistor 148 which are connected in parallel to ground. The collector of transistor 144 is coupled to resistor 146 which is coupled to the voltage source. The collector of transistor of 141 is also coupled to one side of capacitor 147. The other side of capacitor of 147 is coupled via line 75 to frequency sensor 76.

The frequency sensor comprises decoder 149 which may be of the type LM567 manufactured by National Semiconductor. Again typical pin connection numbers are shown in the block representing the decoder. Thus, line 75 is connected to input pin 3 of the decoder. Pin 7 is connected to ground and pin 4 is connected to the voltage source. Connected between pin 4 and output pin 8 is resistor 150. Pins 1 and 2 are connected respectively to capacitors 151 and 152, the other sides of which are connected to ground. Connected between pins 5 and 6 is variable resistor 153. Pin 6 is also coupled to capacitor 154 the other side of which is connected to ground. The frequency of the RF signal which the frequency sensor will detect, that is, F$_0$, will be determined by the value of variable resistor 153 and capacitor 154. The value of F$_0$ is given by the following formula:

$f_0(1/R_1C_1)$, where R$_1$ is the value of variable resistor 153 and C$_1$ is the value of capacitor of 154. If controller 18 for a particular room is to output a disabling signal upon receiving a RF signal of 100 kHz, capacitor 154 should be equal to 0.001 microfarads and variable resistor 153 should be set for 10 KOhms. The RF signal which is to be detected by each room can therefore be set by resistor 153. For example, another room may have resistor 153 equal to 12 KOhms in which event frequency f$_0$ would be 120 kHz.

The output of the frequency sensor is coupled to one input of latch 78 and the input of inverter 85 via line 77. Inverter 85 comprises nand gate 85 the inputs of which are tied together. The inputs of nand gate 85 are also tied to one side of capacitor 155 the other side of which is coupled to ground. The output of nand gate 85 is coupled via line 86 to the other input of latch 78.

Latch 78 comprises nand gates 158 and 159 connected together to form a R/S flip flop. The input of nand gate 158 which is not tied to the output of nand gate 159 is coupled to resistor 157, which is coupled to the voltage source and to one side of capacitor 156. The other side of capacitor 156 is one of the inputs to latch 78 and is coupled to the output of the frequency sensor. The input of nand gate 159 which is not tied to the output of nand gate 158 is coupled to resistor 160, which coupled to the voltage source and one side of capacitor 161. The other side of capacitor 161 is the second input of latch 178 and is connected via line 86 to the output of inverter 85. The second input of latch 78 is also coupled to the anode of diode 162, the cathode of which is coupled via line 69 to manually operated switch 26 and floor switch 34. Through diode 162 latch 78 may be reset by a signal from either of the manually operated switch or the floor switch.

The output of latch 78, which in the preferred embodiment described herein is the same as the output of nand gate 158, is coupled via line 87 to delay means 88. The delay means comprises resistor 163, one side of which is coupled to the output nand gate 158 and the other side of which is coupled to capacitor 164. The other side of capacitor 164 is tied to ground. Resistor 163 is also coupled to resistor 165. The other side of resistor 165 is coupled to the base of npn transistor 166. The emitter of transistor of 166 is tied to ground while the collector is coupled via line 183 to resistor 136 and to the anode of triac driver 137.

Here line 183 is the second output means 79. When peak power demand RF signal of the frequency f$_0$ is received, a voltage high enough to cause transistor 166 to conduct is applied at the base of transistor 166. With transistor 166 conducting line 183 is brought virtually to ground thereby inhibiting any current from the output of delay timer 71 from reaching triac driver 137. Thus, when an RF signal of the frequency f$_0$ is received, triac 138 will be in the blocked condition regardless of the output of the delay timer. When the RF signal disappears, the voltage at the base of transistor 166 will, after a delay period, drop below the voltage necessary to maintain transistor 166 in a conducting mode. When this occurs, that is when 166 turns off, line 183 is no longer tied to ground and current may be applied to triac driver 137 if the output of the delay timer is high.

The delay period for the voltage at the base of transistor 166 to drop sufficiently to turn transistor 166 off (i.e., the delay period during which the delay signal is applied) is determined by the time constant of the RC network comprising resistor 165 and capacitor 164. Because it is undersirable to have the controllers of each room output an enabling signal simultaneously after the RF signal is removed, the values of capacitor 164 and resistor 165 should be different for each controller.

Thus, a system for reducing the unproductive consumption of energy in connection with the heating and cooling of rooms has been described. This system has been described in its preferred embodiments and, as is obvious to those skilled in the art, certain variations may exist which do not depart from the spirit of the invention. In this regard, the present invention may be adapted to other uses in which it is desired that equipment be operated only during the time, and for a brief period immediately after, that a person or thing is present in the area of operation of the equipment.

We claim:

1. A system for reducing the unproductive consumption of energy by equipment primarily intended to be operated during the presence of a person or thing in the area of operation of said equipment and for preventing the recycling of said equipment in the event a person or thing is absent from the area of operation for a short period of time, said system comprising:

first input means responsive to the entrance of said area of operation being closed for providing a first input signal when said entrance is closed;

second input means responsive to a person or thing passing at least one point within the area of operation for providing a second input signal when said at least one point is passed;

first latch means responsive to said first and second input means for providing a presence-detected signal upon both of said first and second input signals being applied to said first latch means and maintaining said presence-detected signal for so long as said first input signal is applied to said first latch means, said first latch means providing an absence-detected signal upon said first input signal being removed and maintaining said absence-detected signal until both of said first and second input signals are applied to said first latch means;

first output means for providing an enabling signal and a disabling signal, said first output means being coupled to said first latch means; and first delay means for providing a first delay signal for a first predetermined time period starting when said first latch begins providing said absence-detected signal, said first delay means being coupled to said first latch means and said first output means;

said first output means providing said enabling signal when any of said presence-detected signal and said first delay signal is present and providing said disabling signal when none of said presence-detected signal and said first delay signal is present, said system being coupled to said equipment, said equipment being operable when said enabling signal is present and being inoperable when said disabling signal is present.

2. The system of claim 1 further comprising lamp means for indicating the existence of the presence-detected signal, said lamp means being coupled to said latch means.

3. The system of claim 1 further comprising:

third input means responsive to a first predetermined condition, for generating a third input signal when said first predetermined condition exists, said first predetermined condition being other than the presence of a person or thing in the area of operation; and inhibit means responsive to said third input means for providing an inhbit signal when said third input signal is present, said inhibit means being coupled to said first output means, said first output means providing said disabling signal when said inhibit signal is present regardless of any of said presence-detected signal and said first delay signal being present.

4. The system of claim 3 wherein said inhibit means comprises:

sensing means for sensing said third input signal and for providing a sensor signal when said third input signal is present; and second output means responsive to said sensing means for providing said inhibit signal, said second output means providing said inhibit signal when said sensor signal is present.

5. They system of claim 4 wherein said inhibit means further comprises:

second delay means responsive to said sensing means for providing a second delay signal for a second predetermined period of time starting when said sensing means ceases providing said sensor signal, said second delay means being coupled to said second output means, said second output means providing said inhibit signal when either of said sensor signal and said second delay signal is present.

6. The system of claim 4 wherein said third input signal is an RF signal and said sensing means is a frequency sensing means for sensing the presence of a predetermined frequency and for providing said sensor signal when the frequency of said RF signal is substantially the same as said predetermined frequency.

7. The system of claim 4 wherein said inhibit means further comprises:

fourth input means responsive to a second predetermined condition, said second predetermined condition being other than said first predetermined condition, for providing an override signal when said second predetermined condition exists; and override means responsive to said fourth input means for providing an override-detected signal when said override signal is present, said override means being coupled to said second output means, said second output means not providing said inhibit signal when said override-detected signal is present regardless of the presence of said sensor signal.

8. The system of claim 7 wherein said inhibit means further comprises:

second delay means responsive to said override means and said sensing means for providing a second delay signal for a second predetermined period of time starting when said inhibit signal is present and said override means begins providing said override-detected signal and starting when said inhibit signal is present and said sensing means ceases providing said sensor signal;

said second delay means being coupled to said second output means, said second output means providing said inhibit signal when said second delay signal is provided by said second delay means regardless of the presence of said override-detected signal.

9. The system of claim 7 wherein said override means comprises:

second latch means responsive to said sensing means and said fourth input means for providing said override-detected signal when said override signal is applied and maintaining said override-detected signal until said sensor signal goes from the absent state to the present state while said override-detected signal is absent.

10. The system of claim 9 wherein said inhibit means further comprises:

second delay means responsive to said sensing means and said override means for providing a second delay signal for a second predetermined period of time starting when said said inhibit signal is present and said override means begins providing said override-detected signal and starting when said inhibit signal is present and said sensing means ceases providing said sensor signal;

said second delay means being coupled to said second output means, said second output means providing said inhibit signal when said second delay signal is provided by said second delay means regardless of the presence of said override-detected signal.

11. The system of claim 10 wherein said fourth input means is said second input means, said second predetermined condition being a person or thing passing at least one point within the area of operation.

12. The system of claim 10 further comprising:
switching means responsive to said first output means for switching electric current to said equipment when said first output means is providing said enabling current and for blocking the passage of electric current to said equipment when said first output means is providing said disabling current, said switching means being coupled to said equipment and to a source of electric current.

13. The system of claim 12 wherein said switching means comprises:
first lead means for coupling said switching means to said source of electric current;
second lead means for coupling said switching means to said equipment; and
relay means responsive to said first output means for coupling said first and second lead means to each other when said enabling signal is present, said relay means having first contact means coupled to said first lead means and second contact means coupled to said second lead means, said relay means coupling said first and second contact means together when said enabling signal is present and uncoupling said first and second contact means from each other when said disabling signal is present.

14. The system of claim 12 wherein said equipment is a temperature control unit primarily intended to be operated during the presence of a person within the area of operation of said temperature control unit, wherein said area of operation is a room, wherein said first input means comprises a door switch which is closed when said entrance is closed, said first input signal being provided by said first input means when said door switch is closed, and wherein said second input means comprises a manually operated switch which is closed by manual operation, said second input signal being provided by said second input means when said manually operated switch is closed.

15. The system of claim 14 wherein said second input means further comprises a floor switch which is closed when a predetermined part of the floor of said room has weight disposed on it, said floor switch being connected in parallel with said manually operated switch.

16. The system of claim 15 wherein said door switch is a locking switch and wherein each of said manually operated switch and said floor switch is a momentary switch, whereby said second input signal is applied only once for a period of short duration for each time said manually operated switch is manually operated and for each time a weight is disposed on said predetermined part of said floor.

17. The system of claim 14 further comprising:
indicator means responsive to said first latch means for indicating the presence of said absence-detected signal, said indicator means providing a signal perceptible to a person when said absence-detected signal becomes present.

18. The system of claim 14 further comprising:
thermostat means for providing a thermostat signal when the temperature in said room reaches a predetermined value;
said thermostat means being coupled to said first output means, said first output means providing said enabling signal when any of said presence-detected signal, said first delay signal and said thermostat signal is present; said first output means providing said disabling signal when none of said presence-detected signal, first delay signal and said thermostat signal is present; and said first output means providing said disabling signal when said inhibit signal is present regardless of any of said presence-detected signal, said first delay signal said thermostat signal being present.

19. A system for reducing the unproductive consumption of energy by equipment primarily intended to be operated during the presence of a person or thing within the area of operation of the equipment, said system comprising:
detection means for detecting the entering of the person or thing into the area of operation and for detecting the exiting of the person or thing from the area of operation;
first delay means responsive to said detection means for providing a first delay signal when said detection means detects the exiting of the person or thing from the area of operation; and
first output means responsive to said detection means and said delay means for providing an enabling signal during the time between said detection means' detecting the entering and exiting, respectively, of the person or thing into the area of operation and during the time said first delay means provides said first delay signal, and for providing a disabling signal otherwise;
said system being coupled to said equipment, said equipment being operable when said enabling signal is provided by said first output means and being inoperable when said disabling signal is provided by said first output means, whereby said equipment is inoperable during a substantial part of the time the person or thing is absent from the area of operation and whereby recycling of said equipment is prevented in the event the person or thing exits the area of operation and within a short period of time thereafter the area of operation is reentered by the same or another person or thing.

20. The system of claim 19 wherein said detection means comprises:
first detector means for detecting the passing of the person or thing within the area of operation;
second detector means for detecting the passing of the person or thing within the area of operation, said first and second detector means disposed in the area of operation so that the order in which said first and second detector means detect the passing of the person or thing is indicative of the entering of the person or thing and of the exiting of the person or thing; and
first latch means responsive to said first and second detector means for providing a presence-detected signal indicative of the entering of the person or thing into the area of operation when said second detector means detects the passing of the person or thing after said first detector means detects the passing of the person or thing and for providing an absence-detected signal indicative or the exiting of the person or thing from the area of operation when said first detector means senses the passing of the person or thing after said second detector means detects the passing of the person or thing;
said first delay means providing said first delay signal for a first predetermined period of time starting when said first latch means begins providing said absence-detected signal, said first output means providing said enabling signal when any of said presence-detected signal and said first delay signal is present, said first output means providing said disabling signal when none of said presence-detected signal and said first delay signal is present.

21. The system of claim 20 further comprising:
first input means responsive to a first predetermined condition for generating a first input signal when said first predetermined condition exists, said predetermined condition being other than the entering of the person or thing into the area of operation and the exiting of the person or thing from the area of operation; and
inhibit means responsive to said first input means for providing an inhibit signal when said first input signal is applied, said inhibit means being coupled to said first output means, said first output means providing said disabling signal when said inhibit signal is present regardless of any of said presence-detected signal and said first delay signal being present.

22. The system of claim 21 wherein said inhibit means comprises:
sensing means for sensing said first input signal and for providing a sensor signal when said first input signal is present, and
second output means responsive to said sensing means for providing said inhibit signal,
said second output means providing said inhibit signal when said sensor signal is present.

23. The system of claim 22 wherein said inhibit means further comprises:
second input means responsive to a second predetermined condition for providing an override signal when said second predetermined condition exists, said second predetermined condition being other than said first predetermined condition, and
override means responsive to said second input means for providing an override-detected signal when said override signal is present,
said override means being coupled to said second output means, said second output means not providing said inhibit signal when said override-detected signal is present regardless of the presence of said sensor signal.

24. The system of claim 23 wherein said override means comprises:
second latch means responsive to said sensing means and said second input means for providing said override-detected signal when said override signal is applied and maintaining said override detected signal until said sensor signal goes from the absent state to the present state while said override-detected signal is absent.

25. The system of claim 24 wherein said inhibit means further comprises:
second delay means responsive to said sensing means and said override means for providing a second delay signal for a second predetermined period of time starting when said inhibit signal is present and said override means begins providing said override-detected signal and starting when said inhibit signal is present and said sensing means ceases providing said sensor signal;
said second delay means being coupled to said second output means, said second output means providing said inhibit signal when said second delay signal is provided by said second delay means regardless of the presence of said override-detected signal.

26. The system of claim 25 wherein said second input means is said second detector means, said second predetermined condition being the passing of a person or thing within the area of operation.

27. The system of claim 25 further comprising:
switching means responsive to said first output means for switching electric current to said equipment when said first output means is providing said enabling current and for blocking the passage of electric current to said equipment when said first output means is providing said disabling current, said switching means being coupled to said equipment and to a source of electric current.

28. The system of claim 27 wherein said switching means comprises:
first lead means for coupling said switching means to said source of electric current;
second lead means for coupling said switching means to said equipment; and
relay means responsive to said first output means for coupling said first and second lead means to each other when said enabling signal is present, said relay means having first contact means coupled to said first lead means and second contact means coupled to said second lead means, said relay means coupling said first and second contact means together when said enabling signal is present and uncoupling said first and second contact means from each other when said disabling signal is present.

29. The system of claim 27 wherein said equipment is a temperature control unit primarily intended to be operated during the presence of a person within the area of operation of said temperature control unit, wherein said area of operation is a room, wherein said first detector means comprises a door switch which is closed when the entrance of said room is closed, said first detector means detecting the first passing of a person by said entrance when said door switch is closed, and wherein said second detector means comprises a manually operated switch which is closed by manual operation, said second detector means detecting the passing of a person by said manually operated switch when said manually operated switch is closed.

30. The system of claim 29 wherein said second detector means further comprises a floor switch which is closed when a predetermined part of the floor of said room has weight disposed on it, said floor switch being connected in parallel with said manually operated switch, said second detector means detecting the passing of a person by said predetermined part of the floor when said floor switch is closed.

31. The system of claim 29 wherein said door switch is a locking switch and wherein each of said manually operated switch and said floor switch is a momentary switch, whereby said second input signal is applied only once for a period of short duration for each time said manually operated switch is manually operated and for each time a weight is disposed on said predetermined part of said floor.

32. A system for reducing the unproductive consumption of energy by equipment primarily intended to be operated during the presence of a person or thing within the area of operation of said equipment and for preventing the recycling of said equipment in the event a person or thing is absent from said area of operation for a short period of time, said system comprising switching means for making said equipment operable and inoperable and control means for receiving first and second input signals and for providing an enabling signal when the person or thing is present and during a first predetermined period of time thereafter and a disabling signal at other times, said first and second input signals being indicative of the presence of a person or thing within said area of operation, said control means being coupled to said switching means, said switching means making said equipment operable when said enabling signal is present and inoperable when said disabling signal is present, said control means having:

first latch means for receiving said first and second signals;

first delay means responsive to said first latch means for providing a presence-assumed signal upon both of said first and second input signals being present and maintaining said presence-assumed signal for so long as said first input signal remains present and for said first predetermined period of time thereafter, for providing an absence-assumed signal said first predetermined period of time after said first input signal is removed and maintaining said absence-assumed signal until both first and second input signals become present again, and for maintaining said presence-assumed signal in the event said first input signal is removed and then both of said first and second input signals become present again within said first predetermined period of time; and first output means responsive to said first delay means for providing said enabling signal when said presence-assumed signal is present and for providing said disabling signal when said absence-assumed signal is present.

33. The system of claim 32 wherein said control means further comprises indicator means responsive to said first delay means for indicating the presence of said absence-assumed signal, said indicator means providing a signal perceptible to a person when said absence-assumed signal becomes present.

34. The system of claim 32 wherein said control means further comprises inhibit means for providing an inhibit signal during the presence of a first predetermined condition, said inhibit means being coupled to said first output means, said first output means providing said disabling signal when said inhibit signal is present regardless of said presence-assumed signal being present, said inhibit means comprising:

sensing means for receiving a third input signal indicative of the presence of said first predetermined condition and for providing a sensor signal when said third input signal is present; and second output means responsive to said sensing means for providing said inhibit signal, said second output means providing said inhibit signal when said sensor signal is present.

35. The system of claim 34 wherein said control means further comprises override means for receiving a fourth input signal indicative of a second predetermined condition and for providing an override-detected signal when said fourth input signal is present, said override means being coupled to said second output means, said second output means not providing said inhibit signal when said override-detected signal is present regardless of the presence of said sensor signal, said override means comprising:

second latch means for receiving said sensor signal and said fourth input signal and for providing said override-detected signal when said fourth input signal is present and maintaining said override-detected signal until said sensor signal goes from the absent state to the present state while said override-detected signal is absent.

* * * * *